United States Patent
Arata et al.

(10) Patent No.: US 7,066,473 B2
(45) Date of Patent: Jun. 27, 2006

(54) GLASS SEAL WEATHERSTRIP

(75) Inventors: Mitsuaki Arata, Hiroshima (JP); Hitoshi Hamanaka, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days.

(21) Appl. No.: 10/850,084

(22) Filed: May 19, 2004

(65) Prior Publication Data

US 2005/0029752 A1  Feb. 10, 2005

(30) Foreign Application Priority Data

Aug. 7, 2003  (JP) .............................. 2003-289133

(51) Int. Cl.
*E06B 7/22* (2006.01)

(52) U.S. Cl. ...................... 277/652; 277/921; 49/475.1

(58) Field of Classification Search ............... 277/628, 277/630, 906, 652, 921
See application file for complete search history.

(56) References Cited

U.S. PATENT DOCUMENTS

| | | | | | |
|---|---|---|---|---|---|
| 2,083,353 | A | * | 6/1937 | Tannewitz | .................... 49/440 |
| 4,635,947 | A | * | 1/1987 | Hatayama | .................... 277/345 |
| 4,800,681 | A | * | 1/1989 | Skillen et al. | ................. 49/440 |
| 4,969,294 | A | * | 11/1990 | Guillon et al. | ............. 49/495.1 |
| 5,005,317 | A | * | 4/1991 | Saint-Louis Augustin et al. | .......................... 49/495.1 |
| 5,014,464 | A | * | 5/1991 | Dupuy et al. | .................. 49/440 |
| 5,143,772 | A | * | 9/1992 | Iwasa | .......................... 428/122 |
| 5,267,415 | A | * | 12/1993 | Vaughan | ....................... 49/377 |
| 5,447,671 | A | * | 9/1995 | Kato et al. | ................... 264/148 |
| 5,447,749 | A | * | 9/1995 | Iwasa | .......................... 427/200 |

FOREIGN PATENT DOCUMENTS

| | | |
|---|---|---|
| JP | 62-197424 | 12/1987 |
| JP | 1-96322 | 6/1989 |

\* cited by examiner

*Primary Examiner*—Alison K. Pickard
(74) *Attorney, Agent, or Firm*—Frishauf, Holtz, Goodman & Chick, P.C.

(57) ABSTRACT

There is provided a glass seal weatherstrip 20 installed to an automobile and having seal lips 22, 23 which does not damage a door glass in particular, does not produce strange noise and prevents seal lips of the weatherstrip from being entangled by the door glass. Each seal lip 22, 23 makes a slide contact with a door glass 60 while the door glass is moving up and down. Each seal lip 22, 23 is formed in a tang shape in section and is projected diagonally upward direction. Each seal lip 22, 23 is provided with a flock 27 on a surface of a top portion thereof at a side of said door glass 60 in an area from a slide contact portion 80 to a downside thereof. The slide contact portion 70 is an area of each seal lip 22, 23 that makes a contact with the door glass 60. Each seal lip 22, 23 is provided with a sliding member 25 on a surface of a top portion thereof at a side of the door glass 60 in an area from the slide contact portion 80 through the upside thereof to a surface at a reversed side of the door glass 60.

1 Claim, 4 Drawing Sheets

GLASS SEAL WEATHERSTRIP

BACKGROUND OF THE INVENTION

1. Field of the Invention

This invention relates to a glass seal weatherstrip including, for example, a beltline weatherstrip, glass run and the like, which is installed to a door of an automobile and makes a slide contact with a door glass. (The term "slide contact" indicates the situation that the weatherstrip haveing a seal lip thereof makes a contact with a door glass which is moving upwardly or downwardly.)

2. Description of the Prior Art

As illustrated in FIGS. 7 and 8, there is provided a beltline weatherstrip 10 at an upper portion of an automobile door 1 along a beltline 50 of an automobile, and the beltline weatherstrip makes a slide contact with a door glass 60 while the door glass 60 is moving up and down. It should be noted that although a beltline weatherstrip is provided both to an inner side (which is defined as "a beltline inner weatherstrip") and an outer side (which is defined as "a beltline outer weatherstrip") of an automobile intervening the door glass therebetween, in this specification, only the beltline inner weatherstirp 10 will be described, and the other will not.

A beltline weatherstrip 10 is composed of a main body 11, a part of which is inserted into a groove portion 2a of a door trim 2 which is installed to an upper portion of a door 1, and seal lips 12, 13 which are projected diagonally upward direction toward the door glass 60 from upper and lower portions of the main body 11.

In such structure, there is provided, as illustrated in FIG. 9, a sliding member 15 on the edge portion of each seal lip 12, 13 in an area which makes a slide contact with the door glass 60, by means of co-extrusion to provide a better sliding nature against the door glass 60. There is also provided, as illustrated in FIG. 10 and after-mentioned Patent Publication No. 1 and 2, a flock 17 of a low resistance on the edge portion of each seal lip 12, 13. Further, there is a weatherstrip which is provided with a coating of urethane and the like.

Above-mentioned Patent Publication No. 1 is Japanese Unexamined Utility Model Publication No. 1-96322 (FIG. 2, 3), and Patent Publication No. 2 is Japanese Unexamined Utility Model Publication No. 62-197424 (FIG. 2).

In the above-mentioned prior arts, it is desired to provide the sliding member 15 or the flock 17 on the surface of each seal lip 12, 13 not only on the door glass 60 side (the outer side) but also on the top edge thereof and up to the inner side thereof in order for the seal lips 12, 13 not to be entangled by the door glass 60 when the door glass 60 is lowered as illustrated in FIG. 8 with the chain double-dashed lines. The wording "the top edge thereof to the inner side thereof" includes the area between the surface of the door glass 60 side through the curbed top edge portion to the position where the curb is terminated (which is referred hereinafter as "curb end point 70") on the back side surface of each seal lip 12, 13.

In the weatherstrip provided with the sliding member 15 as illustrated in FIG. 9, the sliding member 15 can be easily provided to the back side of the curb end point 70 since the sliding member 15 is co-extruded with the seal lips 12, 13. However, because the sliding member 15 is rather hard, when some dust 18 is caught between the sliding member 15 and the door glass 60 as illustrated in FIG. 9, there is a problem that the door glass 60 is easily damaged by the dust 18. Further there is another problem that when the door glass 60 flaps while the door 1 is opened or closed, some loud noise is produced between the sliding member 15 and the door glass 60.

In the weatherstrip provided with the flock 17 on the seal lips 12, 13, it is difficult to provide the flock 17 until up to the curb end point 70 after applying the adhesive agent 19 on the seal lips 12, 13, because in general the flock 17 is supplied by dropping piles from above after the adhesive agent 19 is applied on the surfaces of the seal lips 12, 13. For that reason, as disclosed in Patent Publication No. 1 and 2, the flock is applied merely on the door glass 60 side of the seal lips 12, 13. According to this prior art, the flock 17 cannot be applied up to the curb end point 70, so that there still remains the problem that the top edges of the seal lips 12, 13 are entangled by the door glass 60 when the door glass 60 is lowered.

Further, in case the coating of urethane and the like is applied up to the curb end point 70, there is needed a masking process, so that it becomes costly and the operation becomes troublesome.

Therefore, it is an object of this invention to provide a glass seal weatherstrip which does not damage a door glass in particular, does not produce strange noise and prevents seal lips of the weatherstrip from being entangled by the door glass.

SUMMARY OF THE INVENTION

In order to solve the above-mentioned problems, there is provided a glass seal weatherstrip (20) as claimed in claim 1. The glass seal weatherstrip (20) is installed to an automobile, and it is provided with seal lips (22, 23). Each seal lip (22, 23) makes a slide contact with a door glass (60) while the door glass is moving up and down. Each seal lip (22, 23) is formed in a tang shape in section and is projected diagonally upward direction. Each seal lip (22, 23) is provided with a flock (27) on a surface of a top portion thereof at a side of said door glass (60) in an area from a slide contact portion (80) to a downside thereof. The slide contact portion (80) is an area of each seal lip (22, 23) that makes a contact with the door glass (60). Each seal lip (22, 23) is provided with a sliding member (25) on a surface of a top portion thereof at a side of the door glass (60) in an area from the slide contact portion (80) through the upside thereof to a surface at a reversed side of the door glass (60).

There is also provided a glass seal weatherstrip (20) as claimed in claim 2. In this invention, the sliding member (25) is provided on each seal lip (22, 23) at a downside of said slide contact portion (80), and the flock (27) is provided on the sliding member (25).

There is further provided a glass seal weatherstrip (20) as claimed in calim 3. In this invention, a second sliding member (35) is provided on each seal lip (22, 23) below the slide contact portion (80), and the flock (27) is provided on the second sliding member (35) through the intermediary of an adhesive agent (29). The second sliding member (35) is made of material whose adhesive effects with said adhesive agent is higher than that of the former sliding member (25).

It will be noted that each numeral in a corresponding parenthesis indicates a corresponding element or matter as indicated in the drawings and the after-mentioned preferred embodiments.

According to the glass seal weatherstrip, the sliding member and the flock are provided in combination on the surface of the seal lip.

The sliding member is provided to the seal lip on the surface of the top portion thereof at the side of the door glass in the area from the slide contact portion through the upside thereof and up to the surface at the reversed side of the door glass. Therefore, even if the slide contact portion against the door glass dispositions above the predetermined position because of any dispersion of a body of an automobile, the door glass still makes a slide contact with the formed sliding member, so that the top portion of each seal lip is not entangled by the door glass while the door glass is lowered.

Further, the flock is provided to the seal lip on the surface of the top portion thereof at the side of the door glass in the area from the slide contact portion against the door glass to the downside. Therefore, when some dust is caught between the flock and the door glass, the dust is embedded in the flock, so that the door glass is not damaged by the dust. Further, the flock is provided to the seal lip only below the slide contact portion and it is not provided above the slide contact portion, so that the flock can easily be formed by a process of dropping piles from above. Moreover, even if a door of the automobile flaps when the door is opened or closed, any noise hitting the door glass does not become such high because it is the flock that makes a contact with the door glass.

It should be noted that in case the flock is provided by using an adhesive agent, it is desired to apply a sliding member which is compatible with the adhesive agent, that is, it is desired to apply a sliding member on the surface of each seal lip which has high adhesive effects with the adhesive agent.

In order to achieve such operation, it can be done so that if a sliding member applied above the slide contact portion of the seal lip is compatible with an adhesive agent, the sliding member may be continuously applied to the downside thereof and a flock can be formed on the extended sliding member. On the other hand, if a sliding member applied above the slide contact portion is incompatible with an adhesive agent, another type of sliding member (second sliding member) having a good compatibility with the adhesive agent may be formed below the slide contact portion of the seal lip and the flock can be applied on the second sliding member.

DESCRIPTION OF PREFERRED EMBODIMENT

A beltline weatherstrip according to a preferred embodiment of the invention will be described referring to FIGS. 1 and 2.

Figure 1:
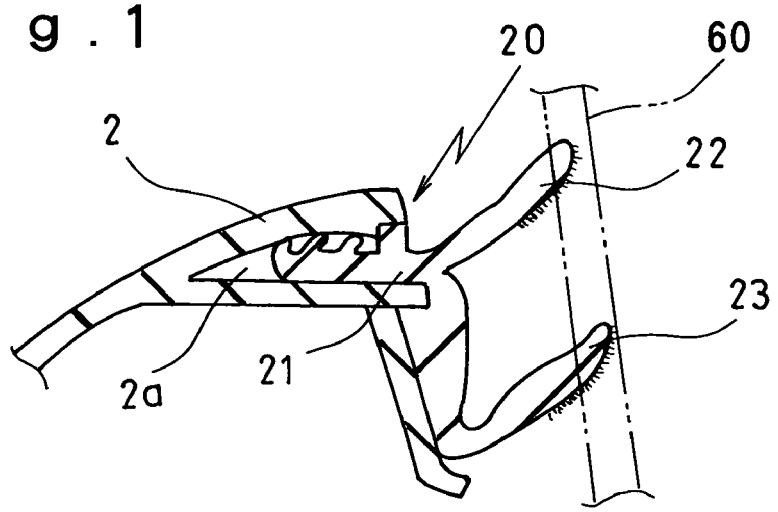
FIG. 1 is an enlarged sectional view along line I—I in FIG. 7 showing a beltline weatherstrip according to a preferred embodiment of the invention.
Figure 7:
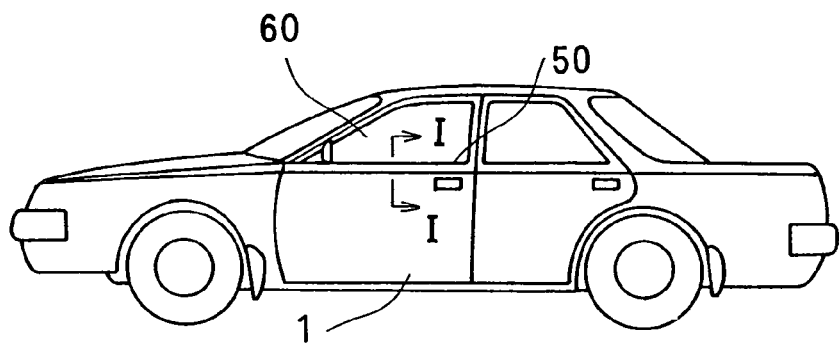
FIG. 7 is an outlook side view of an automobile.

FIG. 1 shows a beltline weatherstrip according to the preferred embodiment of the invention, which is an enlarged sectional view along line I—I in FIG. 7. FIG. 2 is an enlarged sectional view showing a primary portion of the seal lip shown in FIG. 1. Similar numerals are provided for similar parts disclosed in the prior art.

The beltline weatherstrip 20 according to the preferred embodiment of the invention is, like the glass seal weatherstrip 10 described as the prior art, provided to an upper portion of a door 1 of an automobile along a beltline 50 thereof, and it makes a slide contact with a door glass while the door glass is moving up and down.

Further, the beltline weatherstrip 20 comprises a main body 21, a part of which is inserted into a groove 2a of a door trim 2 installed to an upper portion of the door 1, and seal lips 22, 23 which projects diagonally upward from an upper and lower portion of the main body 21 toward the door glass 60. (The numbers of the seal lips are not limited, and in this embodiment two seal lips are provided.) The weatherstrip 20 is made of rubber or resin. It should be noted that in this preferred embodiment, only the weatherstrip 20 installed to an inner side of an automobile (a beltline inner weatherstrip) is diclosed, and a weatherstrip installed to an outer side of an automobile (a beltline outer weatherstrip) is not disclosed. However, the beltline outer weatherstrip can be formed similar to the beltline inner weatherstrip 20.

In this embodiment, each seal lip 22, 23 is formed in a tang shape in section. Each seal lip 22, 23 is the portion in the weatherstrip that makes a slide contact with a door glass 60 of moving up and down. And, as illustrated in FIG. 2, there are provided a sliding member 25 and flock 27 on the top edge of each seal lip 22, 23 to provide it the nature of sliding. The top edge is the portion in each seal lip 22, 23 that makes a slide contact with the door glass 60.

The sliding member 25 is formed with the seal lips 22, 23 at the same time the seal lips 22, 23 are formed by an extrusion molding. The sliding member 25 is formed on a surface of the top portion of each seal lip 22 or 23 at a side of the door glass 60 (the outer side of the automobile) in an area beginning from the contact portion 80 against the door glass 60 toward the upside thereof and up to a surface at a reversed side of the door glass 60 (the innner side of the automobile), including at least the surface of the door glass 60 side through the curbed portion toward the top edge thereof and up to the point the curb is terminated (the point is referred to as "the curb end point") 70. The sliding member 25 may be made of material having a small friction coefficient including, for example, such as TPO (Thermoplastic Elastomer Olefin) and the like.

Figure 8:
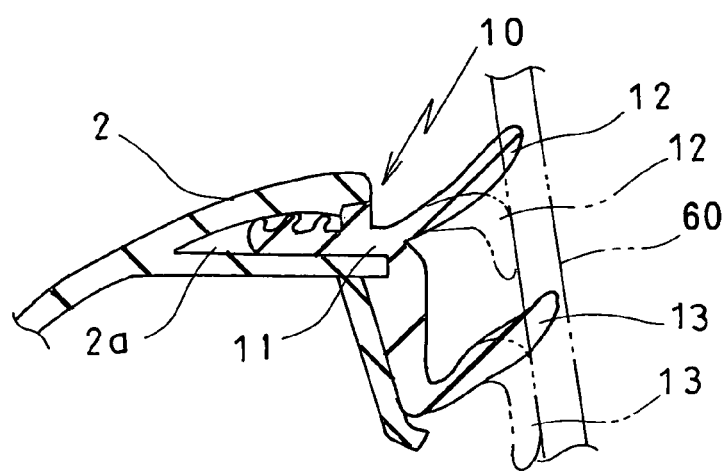
FIG. 8 is an enlarged sectional view along line I—I in FIG. 7 showing a beltline weatherstrip according to a prior art.

As described above, the sliding member 25 is provided up to the curb end point 70, so that even if each seal lip 22, 23 is forced to make a slide contact with the door glass 60 above the slide contact portion 80 caused by any dispersion of a body of an automobile, the sliding member 25 provided at the top edge of each seal lip 22, 23 makes a slide contact with the door glass 60 when the door glass 60 is lowered. Therefore, the seal lips 22, 23 are not entangled by the door glass 60 as illustrated in FIG. 8 with the chain double-dashed lines.

The flock 27 is provided to the top portion of each seal lip 22, 23 through the intermediary of the adhesive agent 29 in the surface of the door glass 60 side (the outer side of the automobile) starting from the slide contact portion 80 to the downside thereof.

Figure 9:
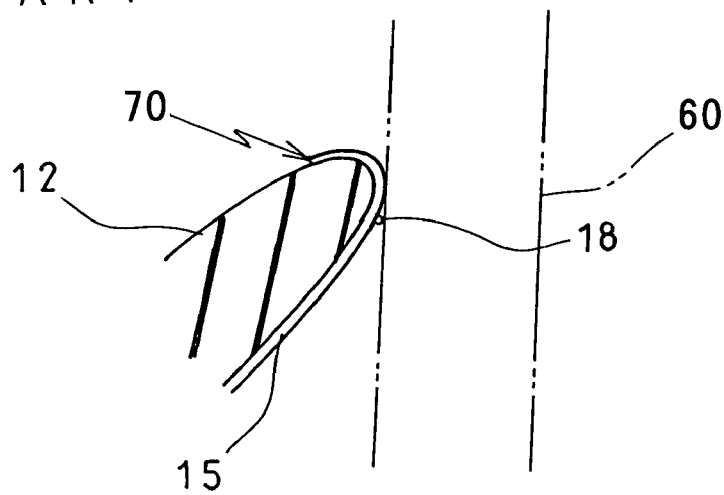
FIG. 9 is an enlarged sectional view showing a primary portion of the seal lip shown in FIG. 8.
Figure 10:
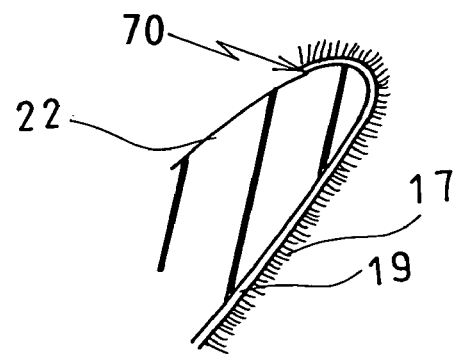
FIG. 10 is an enlarged sectional view showing a primary portion of a seal lip of another prior art.

As the flock 27 is provided from the slide contact portion 80 toward the downside thereof, even if some dust 18 is caught in between the door glass 60 as illustrated in FIG. 9, the dust 18 is embedded in the hair, so that the door glass 60 is not damaged. Further, the flock 27 is provided from the slide contact portion 80 against the door glass 60 to the downside thereof and it is not provided on the upside of the slide contact portion 80, so that the flock 27 can be easily formed by a method of dropping piles from above. Moreover, if the door glass 60 flaps when the door 1 is opened or closed, it is a part of the flock 27 that makes a contact with the door glass 60, so that the noise of hitting the door glass 60 does not rise such high.

It should be noted that in this preferred embodiment, the flock 27 is provided directly to each seal lip 22, 23 through the intermediary of the adhesive agent 29, and therefore, such is effective if the seal lips 22, 23 are made of such material which is compatible and well adhered with the adhesive agent 29 (such material is often found in rather expensive TPO).

Figure 3:
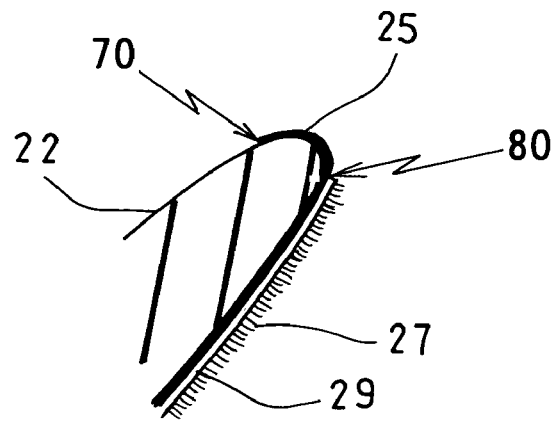
FIG. 3 is an enlarged sectional view showing a primary portion of a seal lip of another preferred embodiment of the invention.

On the other hand, if the seal lips 22, 23 are made of material which is incompatible and not well adhered with the adhesive agent 29 (such material is often found in rather inexpensive TPO), a type of sliding member 25 which is compatible with the adhesive agent 29 can be applied, as illustrated in FIG. 3 as an example, on the downside surface of the slide contact portion 80 against the door glass 60 in each seal lip 22, 23, and the flock 27 can be applied on the formed sliding member 25 through the intermediary of the adhesive agent 29.

Figure 4:
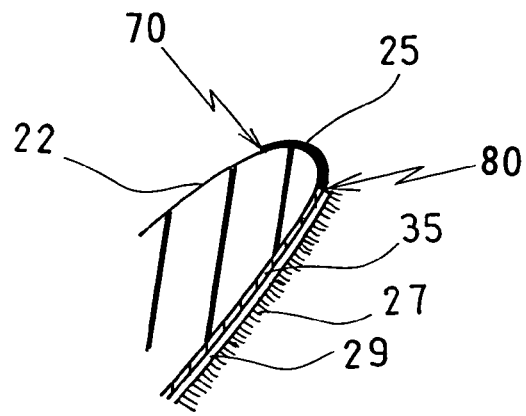
FIG. 4 is an enlarged sectional view showing a primary portion of a seal lip of still another preferred embodiment of the invention.

Further, if the sliding member 25 is not so good in compatibility with the adhesive agent 29, a second sliding member 35 can be applied, as illustrated in FIG. 4, which is made of material dissimilar with the sliding member 25 and is compatible with and performs high adhesive effects with the adhesive agent 29, to the surface of each seal lip 22, 23 below the slide contact portion 80 against the door glass 60, and the flock 27 can be adhered on the formed second sliding member 35 through the intermediary of the adhesive agent 29.

Figure 2:
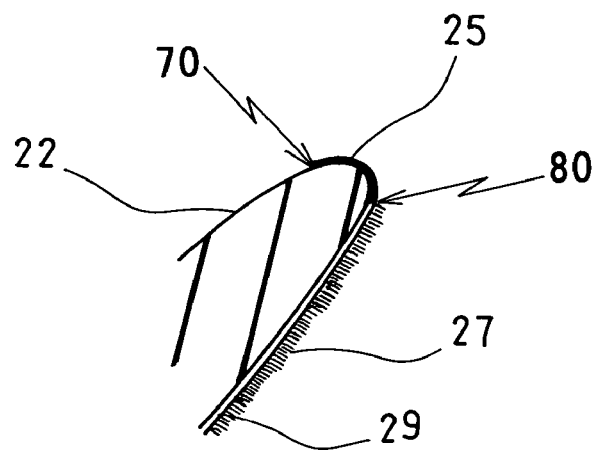
FIG. 2 is an enlarged sectional view showing a primary portion of the seal lip shown in FIG. 1.
Figure 5:
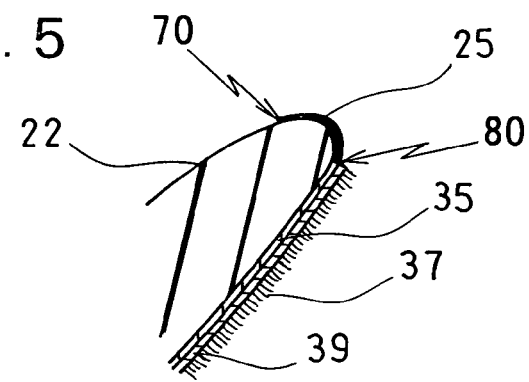
FIG. 5 is an enlarged sectional view showing a primary portion of a seal lip of still another preferred embodiment of the invention.

According to the embodiments illustrated in FIGS. 2 to 4, the flock 27 is provided by a method of dropping piles from above after applying the adhesive agent 29. There can be used another method as illustrated in FIG. 5 instead of the above-mentioned method where a flock film which is composed of a flock 37 and an adhesive agent 39 in unity is adhered on the surface of each seal lip 22, 23.

Figure 6:
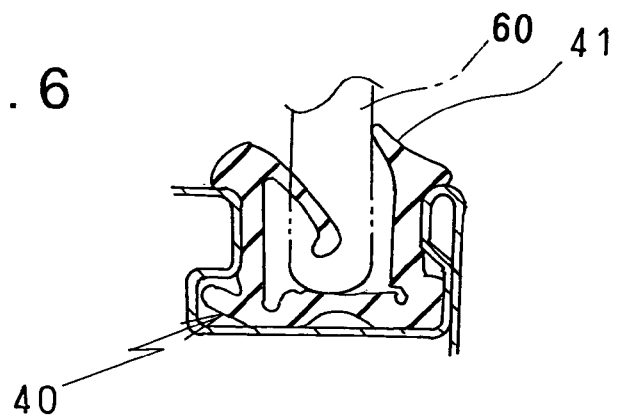
FIG. 6 is a sectional view showing a glass run according to a preferred embodiment of the invention.

Further, although the preferred embodiments of the invention mentioned hereinbefore are described based mainly on a beltline weatherstrip, this invention can also be applied to such a glass run 40 as illustrated in FIG. 6 which comprises a lip 41 facing above.

We claim:

1. A glass seal weatherstrip for an automobile which is provided with seal lips wherein,
   each seal lip slideably engages a door glass while said door glass is moving in one of an upward or downward direction;
   said seal lip having a tang shape in section and being projected diagonally in an upward direction;
   said seal lip having a flock on a surface thereof on a side adjacent said door glass in an area from a slide contact portion of said seal lip which slideably engages said door glass to a downside portion thereof;
   said seal lip having a sliding member on a surface of a top portion thereof at a side of said seal lip adjacent said door glass in an area from said slide contact portion through the upside thereof to a surface which is non-adjacent said door glass;
   a second sliding member is provided on said seal lip below said slide contact portion;
   said flock is secured to said second sliding member via an adhesive agent; and
   said second sliding member comprises a material whose adhesive effects with said adhesive agent is higher than that of said sliding member.

* * * * *